United States Patent
Schindler

(10) Patent No.: US 9,329,062 B2
(45) Date of Patent: May 3, 2016

(54) METHOD FOR CALIBRATING A ROTARY ENCODER

(71) Applicant: Baumueller Nuernberg GmbH, Nuremberg (DE)

(72) Inventor: Achim Schindler, Eichstaett (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 0 days.

(21) Appl. No.: 14/712,114

(22) Filed: May 14, 2015

(65) Prior Publication Data

US 2015/0247746 A1 Sep. 3, 2015

Related U.S. Application Data

(63) Continuation of application No. PCT/EP2012/004713, filed on Nov. 14, 2012.

(51) Int. Cl.

| | |
|---|---|
| G01D 5/30 | (2006.01) |
| G01D 18/00 | (2006.01) |
| G01D 5/244 | (2006.01) |
| G01P 21/02 | (2006.01) |
| G01D 5/347 | (2006.01) |

(52) U.S. Cl.
CPC .............. G01D 18/00 (2013.01); G01D 5/2448 (2013.01); G01D 5/24452 (2013.01); G01D 5/3473 (2013.01); G01P 21/02 (2013.01)

(58) Field of Classification Search
CPC ............ G01D 5/3473; G01D 5/24452; G01D 5/2448; G01D 16/00
See application file for complete search history.

(56) References Cited

U.S. PATENT DOCUMENTS

| | | | | |
|---|---|---|---|---|
| 6,598,196 | B1 | 7/2003 | Bussard et al. | |
| 7,034,282 | B2 * | 4/2006 | Oka | G01D 5/34715 250/216 |
| 7,145,127 | B2 * | 12/2006 | Chin | G01D 5/34707 250/216 |
| 7,557,340 | B2 * | 7/2009 | Wong | G01D 5/3473 250/231.13 |
| 2010/0321006 | A1 | 12/2010 | Suzuki | |

FOREIGN PATENT DOCUMENTS

| | | |
|---|---|---|
| DE | 101 63 504 A1 | 7/2003 |
| DE | 103 35 862 A1 | 3/2005 |
| EP | 2 058 628 A2 | 5/2009 |

\* cited by examiner

*Primary Examiner* — Tony Ko
(74) *Attorney, Agent, or Firm* — Muncy, Geissler, Olds & Lowe, P.C.

(57) ABSTRACT

A method for calibrating a rotary encoder, in particular an incremental encoder, of an electrical machine, wherein the encoder has a number of reference marks and outputs a sine track and a cosine track. The electrical machine can be regulated to a specific speed, an angle of the electrical machine is determined with the aid of the sine track and/or the cosine track, from this an angular progression over time is ascertained, an oscillation in the angular progression over time with a frequency of substantially one integral multiple of the product of the specific speed and the number of reference marks is ascertained, and from this a correction factor the sine track and/or the cosine track is derived, wherein the amplitude of the oscillation is less than or equal to a limiting value. The invention further relates to an encoder evaluation and an electric motor having a rotary encoder.

12 Claims, 4 Drawing Sheets

METHOD FOR CALIBRATING A ROTARY ENCODER

This nonprovisional application is a continuation of International Application No. PCT/EP2012/004713, which was filed on Nov. 14, 2012, and which is herein incorporated by reference.

BACKGROUND OF THE INVENTION

1. Field of the Invention

The invention relates to a method for calibrating a rotary encoder, particularly an incremental encoder, of an electric machine, the encoder outputting a sine track and a cosine track. The invention relates further to an encoder evaluation for carrying out the method and to an electric machine.

2. Description of the Background Art

In machines driven by an electric motor such as, for example, machine tools, the current phase position of the electric motor must be known for the precise operation of the machine. Thus, for example, the accurate metering of plastic in an injection molding machine or the correct pressure by an offset printing press supplied with paper rolls is only possible, if the current angle of the rotor with respect to the stator and/or the current rotational speed of the electric motor are known. Therefore, a rotary encoder which is configured as an incremental encoder and has a specific line count, for example, 256, is typically flange-mounted on a rotor shaft. Consequently, during a rotation of the rotor by 360°, 256 pulses are determined by the incremental encoder. In order to achieve an angular resolution of less than 1.4° (360°/256) as well, a sine and cosine track whose respective period corresponds to a rotation of the rotor by 1.4° is output by the rotary encoder. The sine or cosine track is typically recorded by two photoelectric or magnetic sensors, offset to one another by 90° with respect to their period, therefore in this case 0.35° of the rotor axis.

Because of fabrication tolerances of the rotary encoder, however, the tracks provided by the two sensors do not correspond to an optimal sine or cosine function. It is therefore necessary to calibrate the rotary encoder before the electric machine is operated. Amplitude, phase, and offset errors are differentiated in this regard. In a plot of rotary encoder-generated measuring points of the two tracks in a graph, whereby the x-coordinate of each plotted point corresponds to the measured value of the cosine track and the y-coordinate to the measured value of the sine track, the measuring points of an optimal rotary encoder would lie on a unit circle around the origin. When the unit circle is deformed to form an ellipse, there is accordingly an amplitude error, when the ellipse is tilted there is a phase error, and when the circle is shifted with respect to the origin an offset error of the rotary encoder.

DE 101 63 504 B4 discloses a method for calibrating the rotary encoder. In this case, a measured value is generated from the two tracks by taking the root of the sum of the squares of the two tracks; therefore the radius of the circle is determined provided the measured points were plotted in the aforementioned graph. In a further step, the time course of the determined radius is analyzed iteratively by means of a Fourier transform and correction factors are determined from this to eliminate the particular error. The circle resulting with the corrected tracks in the graph consequently has a center at the origin and a constant radius. In other words, the amplitude of the corrected tracks is the same, the offset of each track is equal to 0, and the phase between the two tracks corresponds to 90°. In other words, the cosine track corresponds to the sine track shifted by 90°.

SUMMARY OF THE INVENTION

It is therefore an object of the invention is to improve the angular resolution of an electric machine.

In an embodiment, the method provides that the electric machine having a rotary encoder is first regulated to a specific speed. The regulation occurs, for example, via a P- and/or I-controller. An angle and from it the time course of the angle of a rotor with regard to a stator of the electric machine are determined from a sine or cosine track, preferably both, of the rotary encoder configured as an incremental encoder. In particular, the angle is the arctangent of the fraction of the sine and cosine track. A number of sine and cosine waves in the sine or cosine tracks, which corresponds to a line count, is provided by the rotary encoder per full rotation of the rotor, whereby the period of the sine and cosine waves is preferably the same. The line count is, for example, equal to 1, so that only a single period of the sine and a single period of the cosine are provided per rotation of the rotor in the sine or cosine track. To obtain the most accurate possible angular resolution, however, the line count is greater and particularly equal to 256, 512, or 1024.

An oscillation whose period corresponds to a rational fraction of the period of the sine or cosine track is determined in the time course of the angle. In other words, the oscillation frequency is an integral multiple of the product of the specific speed and the line count, whereby the specific speed is given particularly in revolutions per second. If a unit for the specific speed is selected as revolutions per minute, the frequency corresponds to a sixtieth part of the multiple of the product.

In a further step, a correction factor, suitably a number thereof, of the sine and/or cosine track is determined by means of which the amplitude, phase, and/or offset of the sine or cosine track are suitably adjusted. The correction factor is thereby selected such that with a change in the particular track by the correction factor and a repeated determination of the angular progression over time by means of the track modified by the correction factor, the amplitude of the oscillation of the angular progression over time is below or equal to a limiting value. For example, 0 (zero) is used as the limiting value. In other words, the angular progression over time generated by the adjusted sine or cosine track no longer has any oscillation with the frequency being considered. The value of the amplitude at which no reduction in amplitude occurs despite a change in the correction factor is used especially preferably as the limiting value. Thus, at least a local minimum of the amplitude as a function of the correction factor is used as the limiting value.

As a result, the plot of the adjusted sine and cosine track does not produce a unit circle in a graph, whereby the x-coordinate of each plotted point corresponds to a point of the adjusted cosine track and the y-coordinate to the corresponding point of the adjusted sine track. Rather, the circle is shifted with respect to the center and/or deformed to form a tilted ellipse.

The angular resolution of the rotary encoder is improved by means of such a process. In fact, the adjusted tracks differ and/or the adjusted tracks differ from an optimal sine or cosine function, but because of this the fact is taken into account that possible sensors of the rotary encoder itself do not provide optimal tracks, for example, because of hysteresis effects. On the contrary, it is considered that substantially no oscillations occur within the angular progression over time during a rotational movement of the electric machine during which the speed is regulated to the specific speed. At least, it is relatively unlikely that an oscillation with a frequency of the integral multiple of the product of the specific speed and the line count occurs, therefore that there is a periodic disturbance of the electric machine. Such oscillations therefore arise due to fabrication tolerances of the rotary encoder. Consequently, these are artifacts that are eliminated by the proposed calibration. In comparison with the prior art, the angular progression over time itself is considered and because of this, the artifact is removed from the two tracks as a result. The tracks encumbered with artifacts are not mapped onto an optimal sine or cosine function by means of which only a wrong angular resolution can be calculated in a faulty rotary encoder. In other words, a calibration of the two tracks is intentionally brought about in which the tracks do not correspond to the particular optimal function.

The method is carried out in an automated manner, for example, by means of an encoder evaluation or a control device, particularly after an initial installation of the electric machine, whereby the determined correction factor is used during the entire runtime of the electric machine. Alternatively or in combination therewith, the correction factor is again determined at specific periodic intervals or the method is carried out manually.

Suitably, the determination of the correction factor(s) takes place iteratively. For example, after the oscillation is determined and it is established that its amplitude is greater than the limiting value, the particular correction factor is set to a predefined, particularly constant value and by means of it the particular adjusted track is created again, and the adjusted angular progression over time is expediently determined herefrom. If the adjusted angular progression over time continues to exhibit the oscillation whose amplitude continues to be greater than the limiting value, the specific value is added to the correction factor and the particular track is adjusted again. These steps take place in particular until the amplitude is less than or equal to the limiting value.

Provided a local minimum of the amplitude as a function of the correction factor is used as the limiting value, the adjustment, therefore the addition of the specific value to the correction factor, occurs expediently until the amplitude increases. In such a case, the correction factor is decreased once by the specific value and the method is ended. An implementation of the method can be carried out relatively efficiently by means of the iterative approach, because no complicated calculations for determining the correction factor itself are necessary. In fact, the number of arithmetic operations increase but these are relatively simple to carry out. Further, a stable correction factor is found after even a relatively low number of iterations steps.

In an embodiment of the invention, the angular velocity can be used as the angular progression over time. In other words, the oscillation within the angular velocity is identified, which is possible relatively easily, because for this purpose only the angular velocity needs to be subtracted from the specific speed to which the electric machine is regulated.

Especially preferably, only the oscillation can be considered whose frequency is equal to the product of the line count and the specific speed. Therefore, only the oscillation is considered whose period corresponds to the distance between two line counts of the rotary encoder. Consequently, artifacts are considered that arise periodically in the sine or cosine track between two lines of the rotary encoder, as is the case, for example, in hysteresis effects. In other words, each region between two lines is treated substantially the same with this type of selection of the frequency, whereby to determine the oscillation only a relatively low number of measured values needs to be available without the fear of information loss. Further, the lowest possible frequency, which, on the one hand, is the most noticeable for human hearing and, on the other hand, could lead to a risk to the electric machine due to excitation, is removed from the angular progression over time in this way.

Expediently, the correction factor corresponds to the offset of the sine and/or cosine track. In other words, only the offset of the sine or cosine track is therefore changed by the method in order to reduce the amplitude of the oscillation within the angular progression over time. On the one hand, such an approach is relatively simple, because only a constant value is added to or subtracted from the particular track. On the other hand, an oscillation with a frequency that is equal to the product of the specific speed and the line count is intensified or suppressed within the angular progression over time by means of the offset shift of the particular track.

Suitably, a phase of the oscillation with respect to the sine and/or cosine track is determined. In other words, it is determined whether the considered oscillation leads or lags behind the particular track. For example, the phase is determined by a Fourier analysis, particularly a fast Fourier transform (FFT), which is applied to the oscillation and/or the particular track. It is made possible in this way to consider a number of oscillations within the angular progression over time in a single step.

The phase can be determined via the Goertzel algorithm and the frequency of the oscillation is determined before the use of the algorithm. Because of the use of the Goertzel algorithm, the number of arithmetic operations is reduced, namely to substantially the eightfold of the employed measured values, whereby preferably only a single frequency is analyzed during the method. Expediently, in this case the amplitude of the oscillation is determined in the same step. In other words, the Goertzel algorithm is applied only once to the angular progression over time in order to obtain both the amplitude and the phase of the oscillation. It is also possible, however, to use the Goertzel algorithm only for determining the amplitude of the oscillation, independent of the determination of the phase.

If the phase difference of the oscillation and the sine track is less than ±90°, suitably the offset of the sine track is increased. In other words, the offset of the sine track is used as the correction factor and is increased if the oscillation leads the sine track in the angular progression over time by less than 90° or lags behind by less than 90°. The procedure is similar, for example, with the cosine track in order to calibrate it. In particular, if the adjustment of the tracks occurs iteratively, the particular offset is therefore increased or reduced by a specific, previously established value. A relatively simple determination of the correction factor is made possible in this way, without complex calculations having to be performed.

Alternatively, the offset of the sine track and/or cosine track can be reduced, if the oscillation in the angular progression over time leads the particular track by more than 90° and expediently less than 270°. Here as well, the determination of the correction factor is simplified because of the robust approach. Expediently, both in the case of the sine track and the cosine track, the offset is either increased or decreased depending on the determined phase position. In other words, both tracks are changed depending on the phase position of the oscillation without a new calculation of the angular progression over time having to be done in between. Thus, during an adjustment of the two tracks the amplitude of the oscillation is reduced relatively extensively. Provided the method occurs iteratively, consequently only relatively few iteration steps are necessary until the end of the method.

For example, in a further process step the amplitudes of the two tracks are matched to one another. In other words, the amplitudes of the sine and cosine track are the same. The adjustment occurs preferably by means of a minimum/maximum comparison of the two tracks. Consequently, both the maximum and minimum are determined for each track and the difference between them is used as the double amplitude. Either the sine or cosine track is adjusted by multiplying the individual measured values of the tracks by a suitable factor such that the difference between the now new maximum and the new minimum corresponds to the corresponding difference of the respective other track. Alternatively, the amplitudes of the two tracks are adjusted to an auxiliary quantity. The adjustment of the amplitudes occurs in an expedient manner before the first calculation of the angle of the electric machine based on the sine and/or cosine track. Rather, the now amplitude-adjusted sine and/or cosine track are used for determining the correction factor. In other words, the individual points of the two tracks produce a circle and preferably a unit circle, said points being associated with one another and plotted in the mentioned Cartesian coordinate system.

By means of the adjustment of the amplitudes to one another and especially to a previously established amplitude, further oscillations in the angular progression over time, whose frequency corresponds to double the product of the specific speed and the line count, are avoided or at least reduced. For example, the amplitudes after the adjustment are not modified further. Alternatively, it is also possible to use the amplitude as an especially additional correction factor, and by means of an adjustment of the amplitude to prevent an oscillation in the angular progression over time with a frequency of double the product of the specific speed and the line count or at least to reduce the amplitude of this oscillation.

Expediently, before the first determination of the angle, based on at least one of the two tracks, the offset of the sine and/or cosine track is modified such that the integral over the specific track along a period is equal to zero (0). In other words, the offset of the sine or cosine track is set to a value at which the corresponding track swings around the particular zero line. Consequently, the center of the circle formed from the values of the sine and cosine track in the indicated Cartesian coordinate system is located at its origin. The determination of this offset, by means of which the first time of the angles and the first angular progression are determined, occurs, for example, by integration or a minimum/maximum comparison. In this case, the particular track is shifted such that the value of the minimum corresponds to the value of the maximum of the particular track. Suitably, this first setting of the offset occurs in a step with the amplitude adjustment, provided this occurs. Due to the first selection of the offset, in a subsequent determination of the correction factor the value of the correction factor is relatively low, if the offset is used as the correction factor. In particular, if the adjustment occurs iteratively, only a small number of iteration steps is necessary in a first selection of the offset such that the integral over the period is equal to zero (0).

Alternatively or in combination with the adjustment of the amplitude and/or of the offset before the first calculation of the angle and its progression over time, the phase between the two tracks is adjusted, so that the cosine track corresponds to a sine track shifted by 90°. Preferably, before the first calculation of the angle and of the progression over time and the determination of an oscillation within it, the sine track and the cosine track, used for this purpose, are adjusted such that the two-dimensional plot of the values generated by both tracks in the indicated Cartesian coordinate system, in which the cosine and sine in each case form an axis, produces a concentric unit circle around the origin. Then, the first time of the angle and the angular progression over time are formed and the oscillation is determined herein, whereby the adjusted tracks are used for this purpose. Depending on the frequency of the oscillation, in a further step either the offset, the amplitude, or the phase is adjusted further as the correction factor, so that the amplitude of the oscillation is below the limiting value or equal to it.

Expediently, a constant speed is used as the specific speed to which the electric machine is regulated. For example, the specific speed is selected such that the frequency of the oscillation is between 50 Hz and 200 Hz. If the rotary encoder has a line count of 1024, and the product of the specific speed and the line count is used as the frequency, the specific speed is therefore between 2.9 revolutions per minute (rpm) and 12 rpm. It is assured in this way that the rotor of the electric machine runs substantially uniformly and the oscillation determined in the angular progression over time is not caused by an acceleration or deceleration of the rotor.

For example, the regulation of the electric machine to the specific speed occurs on a test bench and the actual speed, which is compared with the specific speed, is determined with use of a further, already calibrated tachometer. Expediently, however, the regulation of the electric machine to the specific speed occurs by means of the rotary encoder itself to be calibrated, because the error to be eliminated by the calibration is relatively small.

The encoder evaluation, preferably configured as a control device, is set up and provided to carry out the method, particularly in terms of circuitry or programming. For this purpose, the control device has, for example, a memory from which the program is loaded into a microprocessor. Alternatively, the microprocessor is already configured as an application-specific circuit (ASIC). Expediently, the encoder evaluation comprises a memory for recording the sine and cosine track provided by the rotary encoder; the memory is configured, for example, as a ring buffer. Further, the encoder evaluation preferably has a memory for storing the particular correction factor.

The encoder evaluation or the control device is, for example, a component of an electric machine with a rotary encoder, or the electric machine is calibrated by means of the method, in particular the rotary encoder. For example, for this purpose the determined correction factor is stored in a memory of the rotary encoder or the control electronics of the electric machine. At least, the electric machine configured as an electric motor has a fluctuation in the angular velocity, calculated by means of the sine and/or cosine track, around the actual speed of less than 2° per second, especially at an actual speed between 50 rpm and 70 rpm. For example, the electric motor has a torque between 300 and 1000 Nm and/or a power between 5 kW and 150 kW. For example, the specific speed during operation is between 50 rpm and 1000 rpm. Consequently, it is possible to use the electric motor in the case of an offset printing press, which is supplied, e.g., with continuous paper, whereby nevertheless a precise printed image can be produced because the actual angular position of the rotor and its speed are known. Also when the electric motor is used in an injection molding machine, the precise metering of the material to be injected is made possible. In particular, the electric motor is a component of an offset printing press or an injection molding machine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
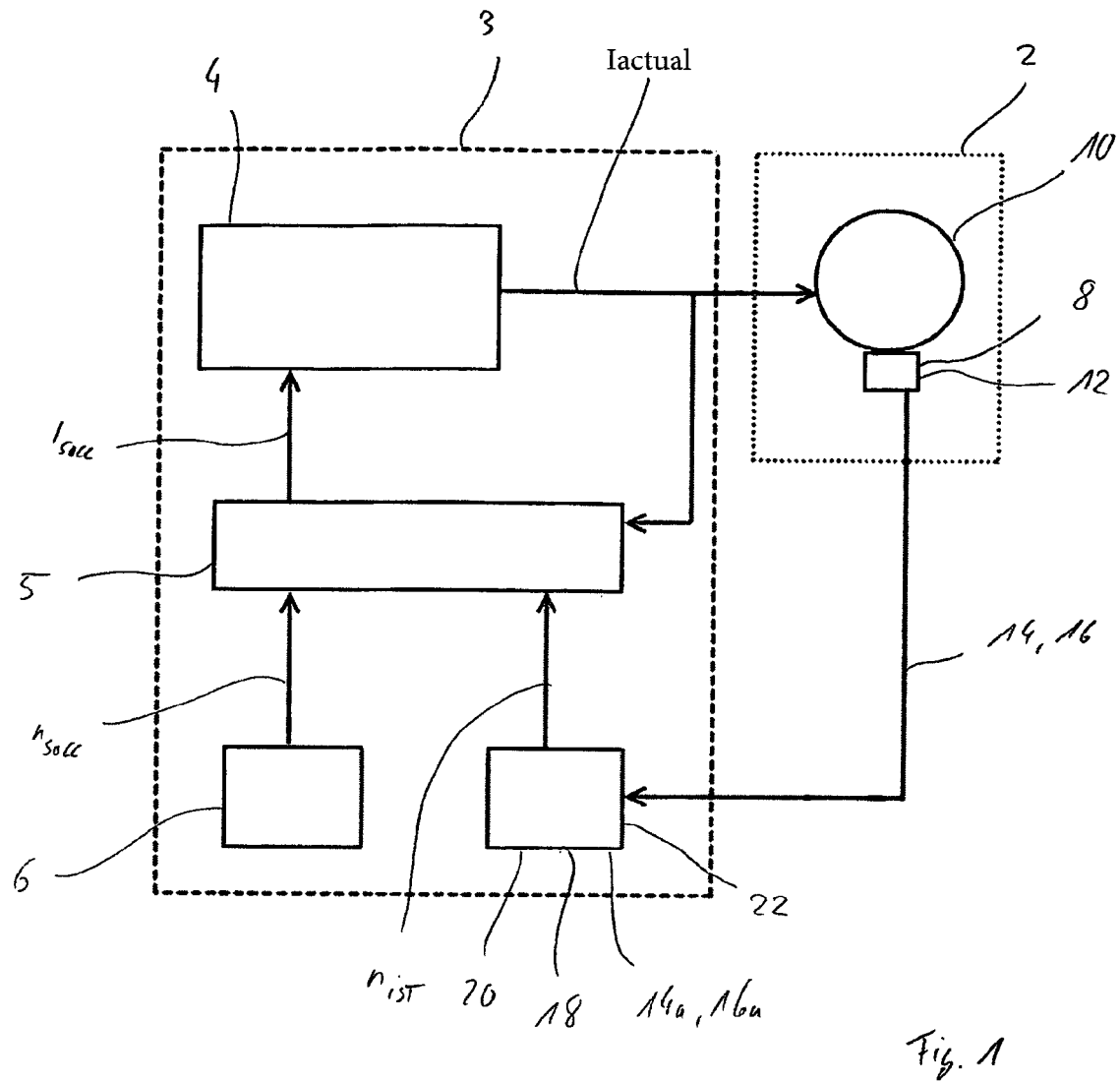
FIG. 1 shows schematically an electric motor with a rotary encoder.

An electric motor 2, which is supplied by means of a converter 3 with a three-phase alternating current $I_{actual}$, is shown schematically in FIG. 1. Converter 3 itself is driven by means of a current controller 4 and a rotational speed controller 5, which is supplied both with the value of the alternating current $I_{actual}$ and a current rotational speed $n_{actual}$ of electric motor 2 and a specific speed $n_{target}$. A target current $I_{target}$ is calculated from these data and sent to current controller 4, according to whose specifications current valves (not shown) of converter 3 are operated. The specific speed $n_{target}$ in this case is preset, depending on the requirements for electric motor 2, by means of a target value setting unit 6 but also if a calibration of electric motor 2 is started.

The current rotational speed $n_{actual}$ is determined via an incremental encoder 8 operating according to a photoelectric principle, which is flange-mounted on the B-side on a shaft of a rotor/stator unit 10. Incremental encoder 8 has a line count 12, which is 512, whereby a number of 512 pulses are detected per rotation of incremental encoder 8 and both a sine track 14 and a cosine track 16 are generated, whereby the frequency of the oscillations in the particular tracks 14, 16 corresponds to the product of the current rotational speed $n_{actual}$ and line count 12. In other words, a number of 512 full periods is recorded per full rotation of the rotor within the stator by means of the incremental encoder per sine or cosine track 14, 16.

Sine track 14 and cosine track 16 are supplied to an encoder evaluation 18 and stored in a ring buffer. Incremental encoder 8 is calibrated by encoder evaluation 18 by converting the recorded sine track 14 and cosine track 16 to a calibrated sine track 14a and a calibrated cosine track 16a. For this purpose, a set of correction factors 20 is stored in a memory of encoder evaluation 18, which are determined during the calibration run of electric motor 2 by means of encoder evaluation 18. Based on the calibration of electric machine 2, a highly precise determination of the position of the rotor with respect to the stator and from this calculation of an angular velocity 22 are possible, which fluctuates around the actual current rotational speed $n_{actual}$ by less than 2° per second. In this case, the rotational speed $n_{actual}$ is between 1 and 10 revolutions per second, whereby the applied torque is around 400 Nm and the power around 35 kW. Because of this, it is possible to use electric motor 2 in an offset printing press by which newspapers, for example, are printed.

Figure 2:
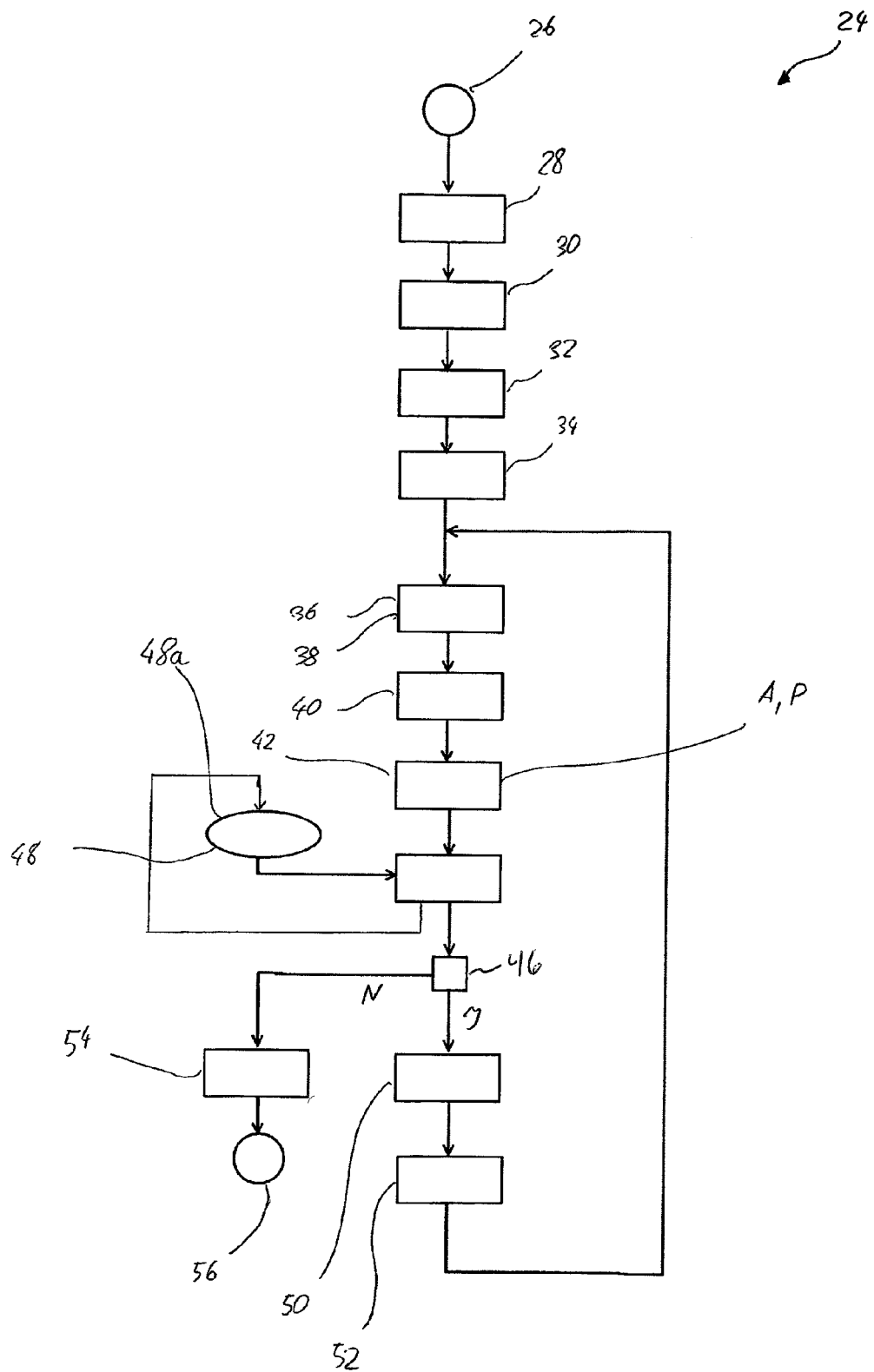
FIG. 2 shows a method for calibrating the rotary encoder.

A method 24 for calibrating incremental encoder 8 is shown schematically in a flowchart in FIG. 2. After a start event 26 that is triggered automatically after the installation of electric motor 2 or manually by an operator of electric motor 2, electric motor 2 is regulated in a control step 28 to a specific speed $n_{target}$ by rotational speed controller 5, whereby the specific speed $n_{target}$ is provided by target value setting unit 6. The specific speed $n_{target}$ is constant and constitutes one revolution per second or 60 rpm. Consequently, a line determined by incremental encoder 8 is expected every $\frac{1}{512}$ s (seconds). If, for example, a time of more than 2 milliseconds passes between two successive lines, the rotational speed is increased by means of controller 6; if the time interval, in contrast, is less than 1.5 milliseconds, the rotational speed is reduced until the interval corresponds to $\frac{1}{512}$ s.

As soon as the current rotational speed $n_{actual}$ corresponds sufficiently precisely to the specific speed $n_{target}$, in a recording step 30 sine and cosine track 14, 16 is determined by incremental encoder 8 and stored in the ring buffer of encoder evaluation 18. In an offset adjustment step 32 and an amplitude adjustment step 34, both sine track 14 and cosine track 16 are adjusted such that their respective offset O corresponds to a value of zero (0) and the respective amplitude A to a value of 1024 bits. In other words, the minimum of the amplitude-rectified sine and cosine track 14, 16 corresponds to a value of −1024 and the maximum to 1024.

Figure 4:
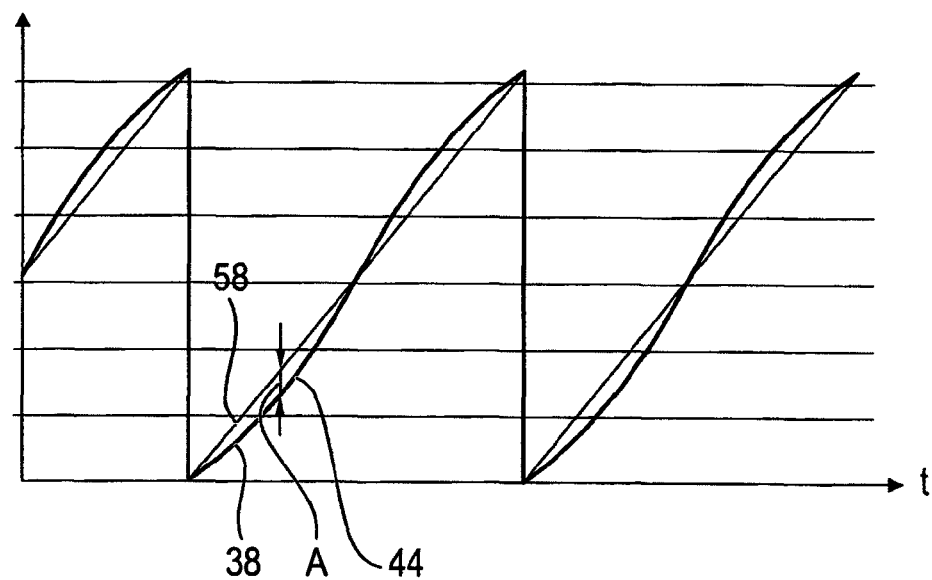
FIG. 4 shows an alternative angular progression over time.

In a subsequent angle determination step 36, an angle 38 of the rotor with respect to the stator is calculated (FIG. 4). In this case, arc tan(sine track 14/cosine track 16) is used as angle 38. Angle 38 is generated for each measured value of sine and cosine track 14, 16, so that angular velocity 22 can be determined herefrom as an angular progression over time in a speed determination step 40. For this purpose, the difference between two successive angles 38 is formed and sine and cosine track 14, 16 is divided by the time interval between the points used for determining angle 38.

In an analysis step 42, angular velocity 22 is analyzed by means of the Goertzel algorithm, whereby the product of the specific speed $n_{target}$ and line count 12 is used as the frequency. Consequently, in analysis step 42 the amplitude A and a phase P of an oscillation 44 (FIG. 3b) with the frequency of the product of the specific speed $n_{target}$ and line count 12 in angular velocity 22 are determined. Further, in the same step 42 sine and cosine track 14, 16 is analyzed using the Goertzel algorithm and their respective phase P is determined.

In a comparison step 46 subsequent thereto, the amplitude A of oscillation 44 is compared with a reference value 48a, which is first set to a maximum value, for example, 1024 bits, at the start of method 24, therefore substantially right after the start event 26. If the amplitude A of oscillation 44 is smaller than reference value 48a, the previous reference value 48a is overwritten with the amplitude A of oscillation 44, and the phases P, determined in analysis step 46, of oscillation 44 with respect to sine and cosine track 14, 16 are compared in a phase comparison step 50.

If the phase P of oscillation 44 with respect to sine track 14 is greater than +270° and less than +90°, the offset O of sine track 14 is increased in an offset correction step 52. If the phase P of oscillation 44 in angular velocity 22 with respect to sine track 14 is greater than +90° and smaller than +270°, the offset O of sine track 14 is reduced by 1 bit. In this case, the maximum of sine track 14 corresponds to a value of 1023 and the minimum to −1025. In offset correction step 52, apart from sine track 14, cosine track 16 is also corrected by its offset O, whereby the offset O is also increased, if the phase P of oscillation 44 with respect to cosine track 16 is between −90° and +90°; therefore oscillation 44 of cosine track 16 lags behind or leads by less than 90°. In the other cases, the offset O of cosine track 16 is reduced, namely, by 1 bit.

After the adjustment of both tracks 14, 16 in the ring buffer of encoder evaluation 18 by means of the respective offset O, angle determination step 36 is again performed in an iterative manner and angle 38 is determined but on the basis of adjusted tracks 14, 16. After this, angular velocity 22 and the amplitude A of oscillation 44 are determined by means of newly created angle 38 and compared with the newly generated reference value 48a, therefore the amplitude A of oscillation 44 before the last adjustment of the offset O of sine and cosine track 14, 16. If the amplitude A now present, furthermore, is less than or equal to reference value 48a, the offset O of both tracks 14, 16 is again increased or decreased in each case by 1 bit, depending on the phase position of oscillation 44 relative to the particular track 14, 16.

If the amplitude A is greater than reference value 48a, reference value 48a is used as a limiting value 48. In other words, limiting value 48 is at least a local minimum of the amplitude A of oscillation 44 as a function of the offset O of sine and cosine track 14, 16. If the amplitude A of oscillation 44 is less than or equal to this limiting value 44, in a storage step 54 the amplitudes and offsets A, O determined in adjustment steps 32, 34, 52 are stored as correction factor 20 in the memory of encoder evaluation 18. The offsets O of sine and cosine track 14, 16 in this case correspond to the offset O before the execution of the most recent offset correction step 52. After correction factors 20 are stored in the memory, method 24 reaches an end 56, and correction factors 20 are now used for calculating the corrected sine and cosine track 14a, 16a.

Figure 3A:
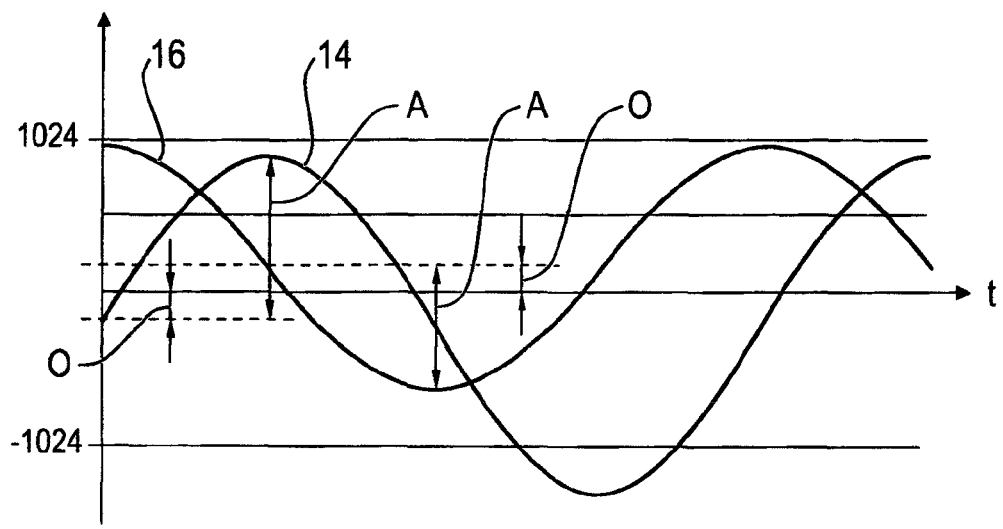
FIGS. 3a-c show intermediate steps of the method.
Figure 3B:
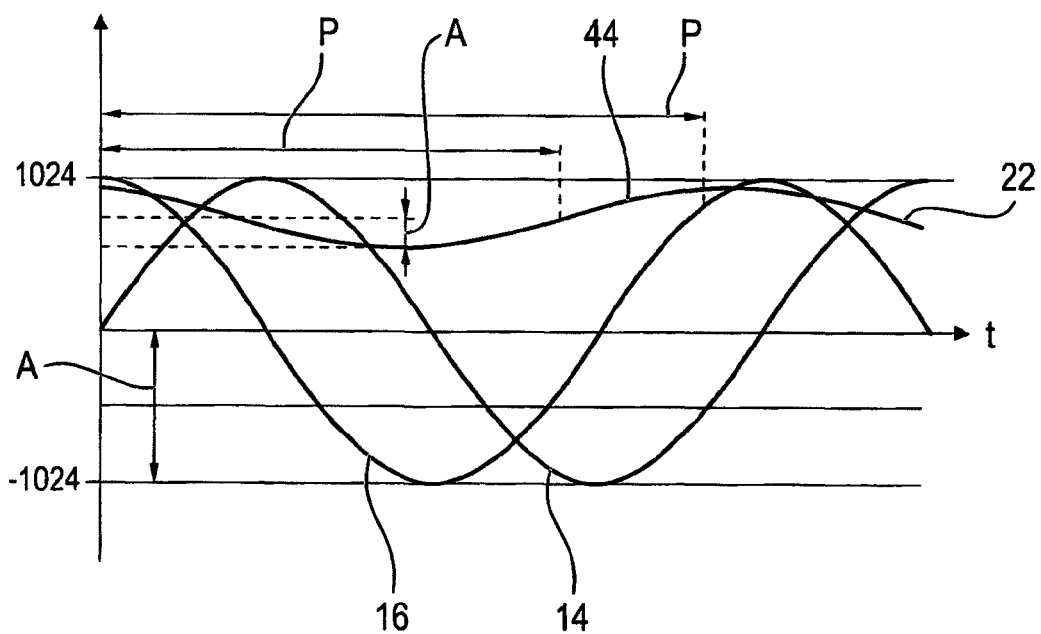

The time course of sine track 14 and cosine track 16 is shown in FIG. 3a, as it exists after recording step 30. Thus, sine track 14 has a negative offset O and an amplitude A, which is greater than 1024 bits. The amplitude A of cosine track 16, in contrast, is smaller than 1024 bits and its offset O is positive. FIG. 3b shows sine and cosine tracks 14, 16, amplitude- and offset-rectified after adjustment steps 32, 34, whose respective offset O corresponds to a value of zero (0) and its amplitude to 1024 bits. The two parameters A, O of each track 14, 16 are determined either by integration over a period, a minimum/maximum comparison, or application of the Goertzel algorithm to the particular track 14, 16. Oscillation 44 with the amplitude A can be seen in the calculated angular velocity 22 whose scaling was changed for illustration in the graph. The phase P of oscillation 44 with respect to sine track 14 is approximately 260° and the phase P of oscillation 44 with respect to cosine track 16 approximately 350°. Consequently, in offset correction step 52 the offset O of sine track 14 is reduced and the offset O of cosine track 16 is initially increased.

Figure 3C:
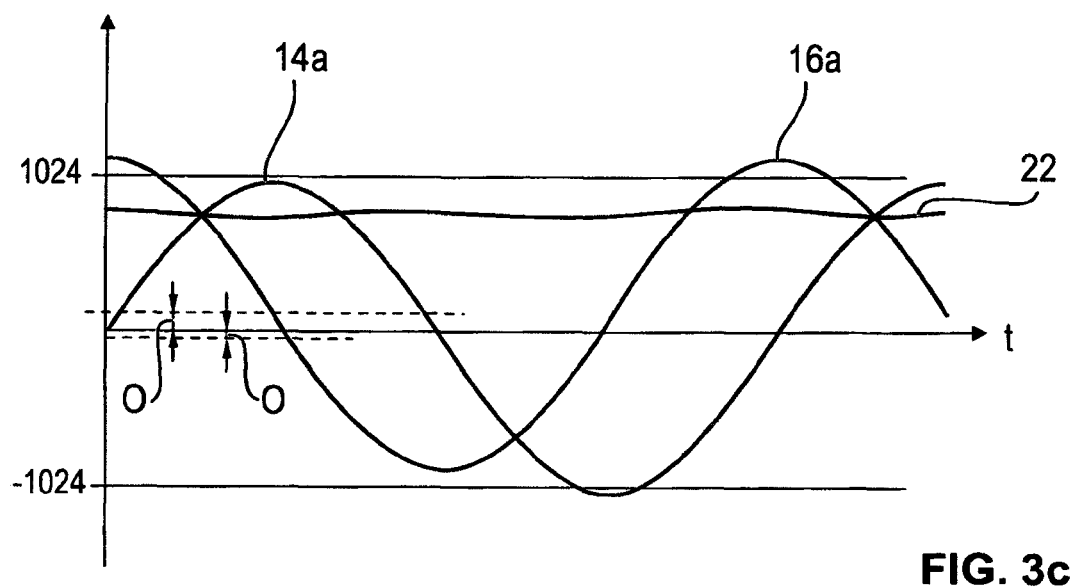

FIG. 3c shows the course of the calibrated sine and cosine track 14a, 16a in which oscillation 44 within angular velocity 22 is no longer observable. The corrected sine track 14a has a slight negative offset O and the corrected cosine track 16a a positive offset O, whereby, in addition to the respective amplitudes A, these offsets O are stored as correction factor 20 in storage step 54 in encoder evaluation 18.

FIG. 4 shows an alternative angular progression over time 38 with oscillation 44. The particular angle 38 itself is used as the angular progression over time, so that an optimal angle 58 with a sawtooth shape would result between the individual lines of incremental encoder 8. The calculated angle 38 fluctuates around it by the amplitude A of oscillation 44.

The invention is not limited to the exemplary embodiment described above. Rather, other variants of the invention can also be derived herefrom by the person skilled in the art, without going beyond the subject matter of the invention. Particularly, further, all individual features described in relation to the exemplary embodiment can also be combined with one another in a different manner, without going beyond the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for calibrating a rotary encoder an electric machine that outputs a sine track and a cosine track and has a line count, the method comprising:
    regulating the electric machine a specific speed;
    determining an angle of the electric machine based on the sine track and/or the cosine track;
    determining an angular progression over time;
    determining an oscillation in the angular progression over time with a frequency of substantially an integral multiple of the product of the specific speed and the line count;
    deriving a correction factor of the sine track and/or the cosine track via which an amplitude, a phase, and/or an offset of the sine or cosine track are adjusted; and
    selecting the correction factor such that with a change in the particular track by the correction factor and a repeated determination of the angular progression over time by the track modified by the correction factor, the amplitude of the oscillation of the angular progression over time is less than or equal to a limiting value.

2. The method according to claim 1, wherein the determination of the correction factor takes place iteratively via a new determination of the angle and of the angular progression over time.

3. The method according to claim 1, wherein the angular velocity is used as the angular progression over time, and wherein a product of the specific speed and the line count as the frequency, and/or the offset the sine track or the cosine track is used as the correction factor.

4. The method according to claim 1, wherein a phase of the oscillation with respect to the sine track and/or the cosine track is determined via a Goertzel algorithm.

5. The method according to claim 1, wherein the offset of the sine track and/or the cosine track is increased if the phase with respect to the sine track or the cosine track is less than ±90°.

6. The method according to claim 1, wherein the offset of the sine track and/or the cosine track is reduced if the phase with respect to the sine track or the cosine track is greater than ±90°.

7. The method according to claim 1, wherein the amplitudes of the sine track and the cosine track are matched to one another.

8. The method according to claim 1, wherein, before a first determination of the angle, the offset of the sine track and/or the cosine track is established such that the integral over a period is equal to zero via a minimum/maximum comparison.

9. The method according to claim 1, wherein a constant speed is selected as the specific speed.

10. An encoder evaluation, which is provided and configured to carry out the method according to claim 1.

11. An electric motor having a rotary encoder, which is calibrated according to the method according to claim 1.

12. The method according to claim 1, wherein the rotary encoder is an incremental encoder.

* * * * *